(12) United States Patent
Herbrich et al.

(10) Patent No.: US 7,090,576 B2
(45) Date of Patent: Aug. 15, 2006

(54) PERSONALIZED BEHAVIOR OF COMPUTER CONTROLLED AVATARS IN A VIRTUAL REALITY ENVIRONMENT

(75) Inventors: Ralf Herbrich, Cambridge (GB); Michael E. Tipping, Cambridge (GB); Mark Hatton, Suffolk (GB)

(73) Assignee: Microsoft Corporation, Redmond, WA (US)

( * ) Notice: Subject to any disclaimer, the term of this patent is extended or adjusted under 35 U.S.C. 154(b) by 206 days.

(21) Appl. No.: 10/609,507

(22) Filed: Jun. 30, 2003

(65) Prior Publication Data

US 2004/0266506 A1    Dec. 30, 2004

(51) Int. Cl.
*A63F 13/00* (2006.01)

(52) U.S. Cl. .................... 463/1; 463/8; 463/6
(58) Field of Classification Search ........ 463/1–9, 463/30–34
See application file for complete search history.

(56) References Cited

U.S. PATENT DOCUMENTS

| | | | |
|---|---|---|---|
| 6,031,549 A * | 2/2000 | Hayes-Roth | 345/474 |
| 6,195,626 B1 | 2/2001 | Stone | |
| 6,199,030 B1 | 3/2001 | Stone | |
| 6,213,871 B1 * | 4/2001 | Yokoi | 463/7 |
| 6,319,121 B1 * | 11/2001 | Yamada et al. | 463/8 |
| 6,371,856 B1 * | 4/2002 | Niwa | 463/43 |
| 6,487,304 B1 | 11/2002 | Szeliski | |
| 6,494,784 B1 * | 12/2002 | Matsuyama et al. | 463/6 |
| 2002/0016195 A1 * | 2/2002 | Namba et al. | 463/3 |
| 2002/0082077 A1 * | 6/2002 | Johnson et al. | 463/30 |

OTHER PUBLICATIONS

Bennewitz, M., Burgard, W., Thrun, S.; "Using EM to Learn Motion Behaviors of Persons with Mobile Robots"; Proceedings of the 2002 IEEE/RSJ International Conference on Intelligent Robots and Systems EPFL, Lausanne, Switzerland, Oct. 2002, pp. 502-507.

* cited by examiner

*Primary Examiner*—John M. Hotaling, II
(74) *Attorney, Agent, or Firm*—Microsoft Corporation

(57) ABSTRACT

Racing-based computer games typically include a mode in which one or more human players can compete against one or more computer-controlled opponents. For example, a human player may drive a virtual race car against a computer-controlled virtual race car purported to be driven by Mario Andretti or some other race car driver. Such computer controlled opponents may be enhanced by including a sampling of actual game behavior of a human subject into the opponent's artificial intelligence control system. Such a sampling can allow the game system to personalize the behavior of the computer control opponent to emulate the human subject.

27 Claims, 6 Drawing Sheets

PERSONALIZED BEHAVIOR OF COMPUTER CONTROLLED AVATARS IN A VIRTUAL REALITY ENVIRONMENT

RELATED APPLICATIONS

This application is related to U.S. patent application Ser. No. 10/610,167 entitled "MODIFIED MOTION CONTROL FOR A VIRTUAL REALITY ENVIRONMENT"; U.S. patent application Ser. No. 10/609,997 entitled "MIXTURE MODELS FOR RACING MOTION LINES IN A VIRTUAL REALITY ENVIRONMENT"; and U.S. patent application Ser. No. 10/609,703 entitled "PROBABILISTIC MODEL FOR DISTRACTIONS IN A VIRTUAL REALITY ENVIRONMENT", all filed concurrently herewith, specifically incorporated herein by reference for all that they disclose and teach.

TECHNICAL FIELD

The invention relates generally to virtual reality environments, and more particularly to personalized behavior of computer controlled avatars in a virtual reality environment.

DESCRIPTION

Most racing-based computer games provide a mode for competing against computer-controlled opponents that use a simple form of artificial intelligence (AI) to negotiate the race track or course in a simulated "human-like" fashion. However, despite the "human-like" goal of such AI, the result tends to appear quite non-human upon close observation. For example, the computer opponent may travel along an ideal or prescribed racing line on the course, whereas a human competitor inadvertently introduces continuous imperfections into his or her driving, such as over/under turning, over/under accelerating, over/under braking, and early/late reactions. However, it is just such imperfections that characterize a "human-like" competitor. As a result, computer opponents tend to become predictable and less interesting.

One reason for the non-human like behavior of some AI competitors is that a typical AI motion control system effectively provides a computer opponent with a reaction time of $\frac{1}{60}^{th}$ of a second in the USA or $\frac{1}{50}^{th}$ of a second in Europe (i.e., for each frame repaint interval in the virtual reality environment). Therefore, computer control of the AI opponent in reaction to any "visual" (e.g., distance to a corner) and "physical" (e.g., loss of traction) stimuli from the virtual reality environment occurs 50 or 60 times a second. No human player can react so quickly, so frequently, or so perfectly as to compete with such an ideally-performing computer controlled opponent.

Therefore, another popular feature of such games is the opportunity to compete against one or more human competitors. For example, two friends can compete against each other at the same console or over a network. Such human vs. human competition typically offers a much more varied and interesting race because human competitors tend to develop their own styles of racing and make significant, non-ideal moves during the race. The result is often a more dynamic, unpredictable, and exciting competition. However, when there are no human competitors available, a human player is generally stuck with playing the very non-human AI controlled competitor.

Implementations described and claimed herein enhance the human-like realism of computer opponents in racing-type games and other computer games. In one implementation, personalized training data is parameterized and recorded for a human subject. Thereafter, a computer controlled avatar may be generated to emulate the style (e.g., strategy, tactics, skill, and short-comings) of the human subject. In this manner, a human player may compete against a more human-like AI control competitor modeled on the human subject. Furthermore, this avatar may be personalized to perform like a friend or a famous competitor in the real world. In addition, the behavior of the avatar may be varied based on variations of the human subject's behavior over multiple training sessions for each game segment to provide a less predictable gaming experience.

In various implementations, articles of manufacture are provided as computer program products. One implementation of a computer program product provides a computer program storage medium readable by a computer system and encoding a computer program for a virtual reality environment. Another implementation of a computer program product may be provided in a computer data signal embodied in a carrier wave by a computing system and encoding the computer program for a virtual reality environment.

The computer program product encodes a computer program for executing on a computer system a computer process for a virtual reality environment. An avatar behavior definition is computed based on environmental context of a virtual reality environment and a randomly selected training behavior from a training set of personalized sample behaviors. At least one control signal is generated to guide behavior of an entity in the virtual reality environment in accordance with the avatar behavior definition.

In another implementation, a method is provided, such that an avatar behavior definition is computed based on environmental context of a virtual reality environment and a randomly selected training behavior from a training set of personalized sample behaviors. At least one control signal is generated to guide behavior of an entity in the virtual reality environment in accordance with the avatar behavior definition.

In yet another implementation, a system is provided. An avatar behavior definition module computes an avatar behavior definition based on environmental context of a virtual reality environment and a randomly selected training behavior from a training set of personalized sample behaviors. A behavior control system generates at least one control signal to guide behavior of an entity in the virtual reality environment in accordance with the avatar behavior definition.

Brief descriptions of the drawings included herein are listed below.

Racing-based computer games typically include a mode in which one or more human players can compete against one or more computer-controlled opponents. For example, a human player may drive a virtual race car against a computer-controlled virtual race car purported to be driven by Mario Andretti or some other race car driver. As described herein, such computer controlled opponents may be enhanced by including a sampling of actual game behavior of a human subject. Such a sampling can allow the game system to personalize the behavior of the computer control opponent to emulate the human subject.

In this manner, the computer controlled opponent may be personalized to behave like famous competitors in the field or like friends and family of the human player. For example, two friends are playing a computer racing game before one of the friends needs leave. The departing friend can enter a training mode to create personalized training data storing it in a persistent storage medium accessible by the gaming system. The remaining friend can then choose to play an avatar that is personalized by that training data to emulate his or her departed friend. Likewise, training data may be generated and/or obtained for more famous participants (e.g., Mario Andretti) and then stored in a persistent storage medium accessible by the gaming system.

Figure 1:
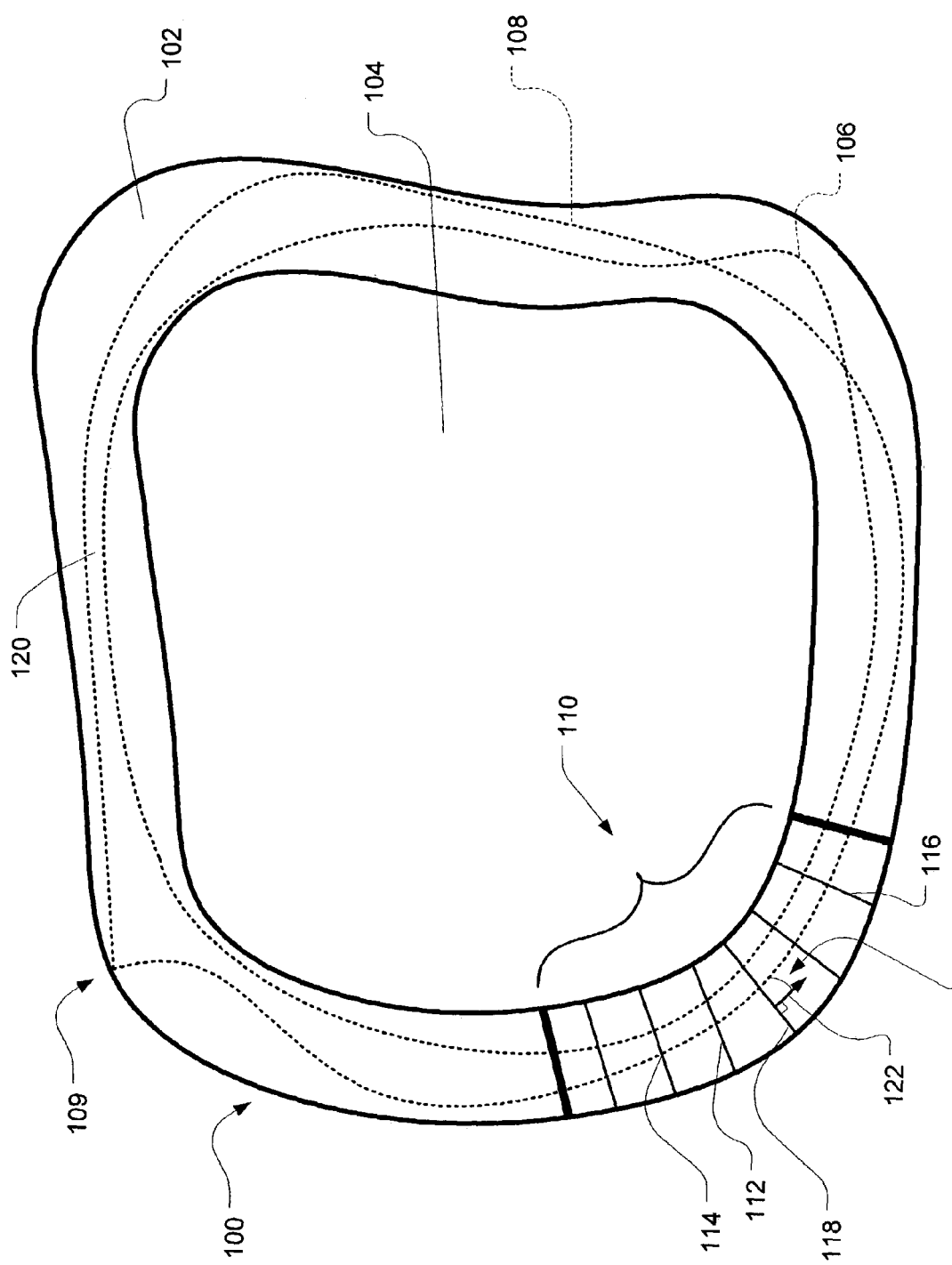
FIG. 1 illustrates a race course and two training racing lines for use in parameterizing an exemplary computer controlled avatar.

FIG. 1 illustrates a race course and two training racing lines for use in parameterizing an exemplary computer controlled avatar. A virtual race course 100 includes a racing surface 102 and an infield 104. It should be understood that an alternative course may not be closed or may be applied to a non-racing environment, such as a first person shooter game, a military simulation, or a reality simulation. As such, a computer controlled driver may be replaced by a computer controlled (or AI controlled) player represented by any moving object.

Two exemplary training racing lines 106 and 108 are shown within the virtual race course 100. Notice that, in one lap, the human driver hit the wall at 109. Such imperfections contribute to the experience of competing against a human competitor. Racing lines, examples of behavior definitions, may be characterized by various parameters, including without limitation locations on the course, and steering, braking, speed, and acceleration parameter sequences. Such training racing lines may be captured, for example, by monitoring and recording a human driver's performance during multiple laps of a race.

The training racing lines 106 and 108 are used to develop personalized training data specific to the human subject that recorded them. Using this personalized training data, the system controls the AI controlled avatar to emulate the human subject's performance. Multiple racing lines provide additional variation that contributes to the unpredictable behavior of the AI controlled avatar.

During a race, at a specified interval (such as a simulation interval or a frame interval, which may be equal in some implementations), an AI motion control system receives stimulus inputs and computes control signals based on these inputs to change the direction, speed, etc. of the computer racing vehicle or other entity. The changes are generally intended to bring the AI driver back into alignment with a racing line (such as an ideal racing line or a personalized racing line). As such, a racing line is a form of a behavior definition that provides guidance to the AI motion control system in controlling the AI driver's path along the track.

A course is divided up into track segments (see, for example, track segment 110). Generally, track segments are a type of game segment, which may also represent a game turn in a strategy game, a scene in a role playing game, a level in a first person shooter, etc., or combinations thereof.

Each racing line is characterized relative to waypoints (such as waypoints 112, 114, 116, and 118) within a track segment. Track segments are examples of a more generic game segment, such as a distance through a maze, one or more rooms in a virtual reality setting, etc. In one implementation, for example, at waypoint 118, a steering angle 120 between a normal vector (normal to the waypoint line across the track) and the sampled racing line characterizes the racing line to the system. Waypoints and the steering angles are then used by the AI motion control system to compute proper motion control signals for the AI controlled entity (e.g., the racing vehicle).

Figure 2:
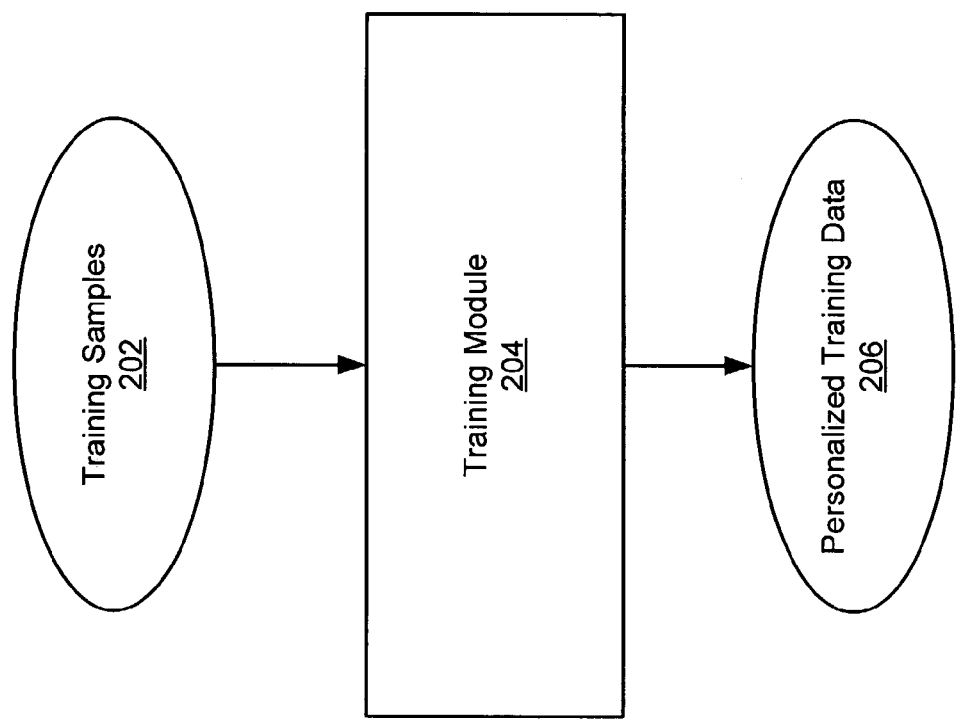
FIG. 2 illustrates an exemplary system for generating a personalized training data.

FIG. 2 illustrates an exemplary system 200 for generating a personalized training data. A set of personalized training samples 202 are generated and input to the training module 204. In one implementation, personalized training samples 15 are generated by monitoring performance of a human subject during game play. Characteristics of the environment (e.g., track geometry, track conditions, etc) and subject's behavior (e.g., a racing line, control signals, etc.) are parameterized and recorded in personalized training data 206. In at least one implementation, the personalized training data may be persistently stored to allow the human player to save training data profiles of various avatar competitors.

Figure 3:
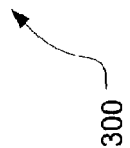
FIG. 3 illustrates exemplary personalized training data.

FIG. 3 illustrates exemplary personalized training data 300 including personalized sample behaviors. Each row corresponds to a particular game segment, as represented by the track segment pictorials along the leftmost column. The first column of each row represents a given game segment in the course. Each game segment may be represented by game segment descriptors, which may include without limitation track segment geometry, track surface conditions, time of day, etc. Each subsequent column corresponds to a sample of the human subject's behavior (i.e., personalized sample behaviors) in the associated game segment.

In addition, the rate of accumulating personalized training data may effectively be increased by "mirroring" training data for a given track segment, thereby doubling the amount of training data extracted for a given amount of training. For example, for some track segments, by extracting training data for a right hand turn and then mirroring both the track segment (to represent a left hand turn) and the personalized racing line sample, two training samples are captured for a single track segment.

In the illustrated table 300, the sample of the human subject's behavior is represented by a racing line for that track segment. As shown in the last row, for example, the human subject provided four sample behavior definitions (e.g., racing lines) for the associated track segment, which appears to be a sharp curve. Differences among the behavior definitions taken by the human subject can be seen in each cell in that row, thereby providing the opportunity to contribute to the unpredictable behavior of the AI avatar on this track segment or a track segments that are similar to this track segment.

In one implementation of a racing game, a racing line may be defined by a sequence of steering angle values at waypoints in a track segment. A steering angle value characterizes the steering angle of the racing line relative to a vector that is normal to the waypoint lines in the track segment. It should be understood that racing lines may be characterized by other parameters or combinations of other parameters, including without limitation sampled locations or vectors within the course, game play actions (e.g., fight sequences), etc. In an implementation of a first person shooter game, a behavior definition may represent a player's movement path.

The track segments included in the training set may or may not be from the current track. In one implementation, a probability density function operation determines similarities between training track segments and the current track segment and computes weighted contributions by sampling racing lines associated with each similar training track segment. The weighting may apply contributions of one or more sample racing lines to the AI avatar's current racing line within the current track segment. In an alternative implementation, personalized avatars may be executed only on tracks on which the human subject has actually trained.

Figure 4:
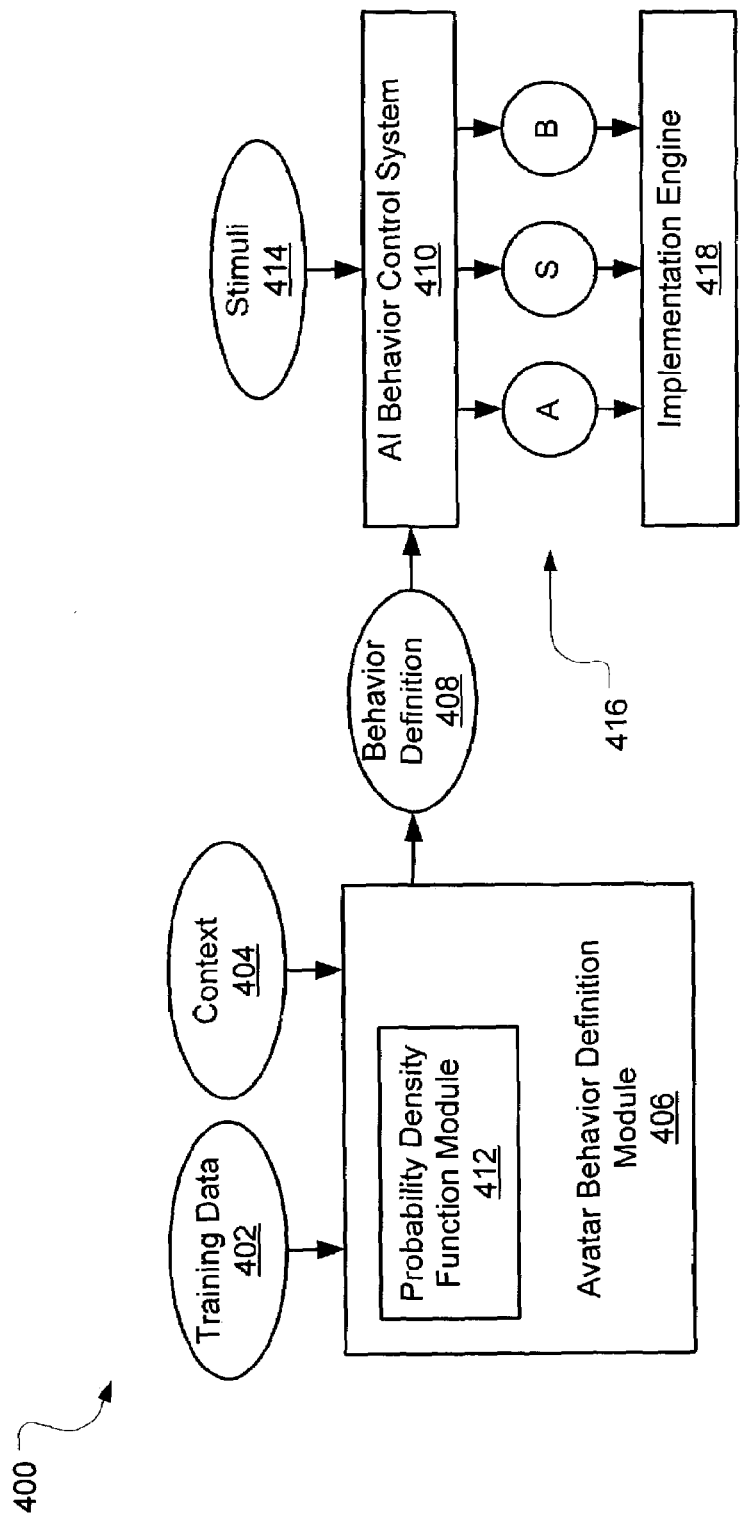
FIG. 4 illustrates an exemplary system for generating control signals for a computer controlled avatar.

FIG. 4 illustrates an exemplary system 400 for generating control signals for a computer controlled avatar. Personalized training data 402 may be provided in a variety of ways, including dynamic generation of the training data based on past or concurrent game play by the human subject, downloading training data from a web resource or storage media, computing training data for fictitious players, etc. Note: With the concurrent game play option, a player could compete against an increasingly improving avatar of himself or herself by starting with an initial set of default or personalized training data and adding to the training set as the player plays the game. As the game play proceeds, the racing lines taken by the user during the game may be added to the training data to enhance the richness of the training samples.

Environmental context information 404 relating to the game segment is provided by the virtual reality environment, such as track location, track segment geometry, etc. The context information parameters, which are similar in format and/or content to the track segment descriptors, are used to match one or more track segments in the training data 402, so as to identify personalized sample behaviors that contribute to the behavior definition of the AI controlled avatar.

The training data 402 and the context information 404 are received by an avatar behavior definition module 406, which computes a behavior definition 408. In one implementation, the behavior definition 408 specifies a personalized racing line to be followed by the AI behavior control system 410. However, other behavior definitions may also be specified, such as an AI avatar's behavior in a first person shooter game, etc.

In one implementation, an avatar behavior definition module 406 randomly selects a sample index (e.g., to select a column of sample data) and evaluates the segment descriptors against the context information 404 to identify appropriate sample data. The sample behavior for the best matching track segment under the randomly selected index may be forwarded as the behavior definition 408 to the AI behavior control system 410.

In another implementation, a probability density function module 412 determines the weighted contribution that one or more samples provides to a behavior definition for a given track segment. The higher the similarity between the context information 404 and the track segment descriptor, the greater the weight applied to the sample data when computing the behavior definition. The weighted sum of these contributions is then forwarded as the behavior definition 408 to the AI behavior control system 410. Other contribution algorithms are also contemplated.

Stimuli 414 from the virtual reality environment is input to the AI behavior control system 410, which generates control signals 416 for controlling the avatar in the virtual reality environment. The control signals 416 are input to an implementation engine 418 to implement the motion or behavior specified by the control signals 416. For example, the implementation engine 418 may cause a virtual race car to change direction and speed.

Figure 5:
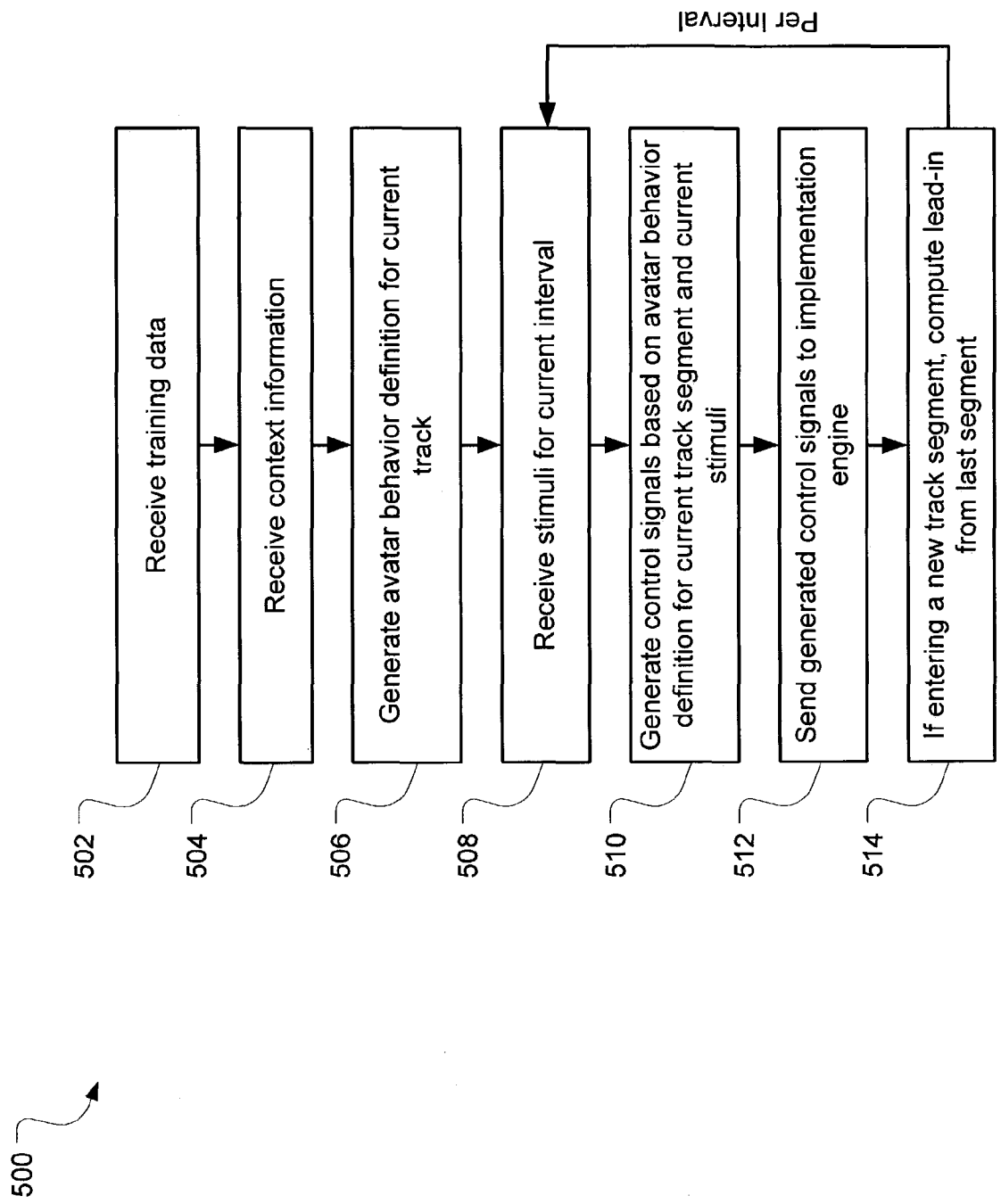
FIG. 5 illustrates exemplary operations for generating control signals for a computer controlled avatar.

FIG. 5 illustrates exemplary operations 500 for generating control signals for a computer controlled avatar. A receiving operation 502 receives personalized training data. Another receiving operation 504 receives context information for the track segments of the current track.

A generation operation 506 generates an avatar behavior definition for each track segment of the current track. In one implementation, a sample index is randomly selected and the sample data corresponding to the track segment having the closest match with context information 504 of the current track is deemed the avatar behavior definition for the current track segment. This selection and evaluation to identify the avatar behavior definition for a current track segment is repeated for each track segment in the current track.

In another implementation, sample data from multiple track segments in the training data may contribute to the avatar behavior definition for a given track segment of the current track. Assume that $BD_i$ represents the behavior definition for a given track segment i in the current track and $SD_{jk_j}$ represents the sample data from row j, column $k_j$ of the training data. An exemplary algorithm is described below:

---

1    For all track segments i in current track
2        For all track segments j in the training data
3            $k_j$=randomly selected sample index over all sample
             columns in the training data
4          $s_j = e^{-\frac{\|\tau_i - \tau_j\|^2}{2\omega^2}}$, wherein $s_j$ represents a weighting factor
            for the $j^{th}$ track segment in the training data, $\tau_i$
            represents the context information for the $i^{th}$
            track segment in the current track, $\tau_j$ represents
            the track descriptor of the $j^{th}$ track segment in
            the training data, and $\omega$ represents a sensitivity
            factor
5       End
6       Normalize $s_j \left( e.g., s'_j = \frac{s_j}{\sum_j s_i} \right)$ 7       $BD_i = \sum_j s'_j \cdot SD_{jk_j}$ 8    End

---

The sensitivity factor $\omega$ specifies how sensitive the weighting factor is to similarities. For example, if $\omega$ is very small, then $s_j$ is small and sample data for fewer training track segments contribute heavily to the behavior definition $BD_i$. In contrast, if $\omega$ is very large, then sj large and sample data for more training track segments contribute heavily to the behavior definition $BD_i$. The sensitivity factor $\omega$ may be preset at game design time or configured by the player or the system.

In one implementation, avatar behavior definitions for all track segments of the current track are computed before race time (e.g., to conserve computational capacity for other functions during race time). However, it should also be understood that, in an alternative implementation, avatar behavior definitions for individual track segments in the current track may be dynamically computed as the track segment is encountered in the virtual reality environment. This approach allows race time events to be considered when determining matches with training data. In addition, a human player's behavior during the current race may be used to dynamically supplement the training data during the race (e.g., to allow the human player to compete against a continually changing avatar of himself or herself).

A receiving operation 508 receives game stimuli from the virtual reality environment for the current simulation interval. Such stimuli is input to a generation operation 510, which generates the control signals used to converge avatar behavior to the avatar behavior definition (e.g., generated in the generation operation 506) based on the stimuli. For example, the control signals in a racing game are generally intended to steer the AI control vehicle toward a racing line.

An implementation operation 512 applies the control signals to the virtual reality environment through an implementation module. For example, exemplary implementation modules may include a racing physics engine. Operations 508, 510, and 512 repeat each simulation interval to progress the action in the virtual reality game.

Figure 6:
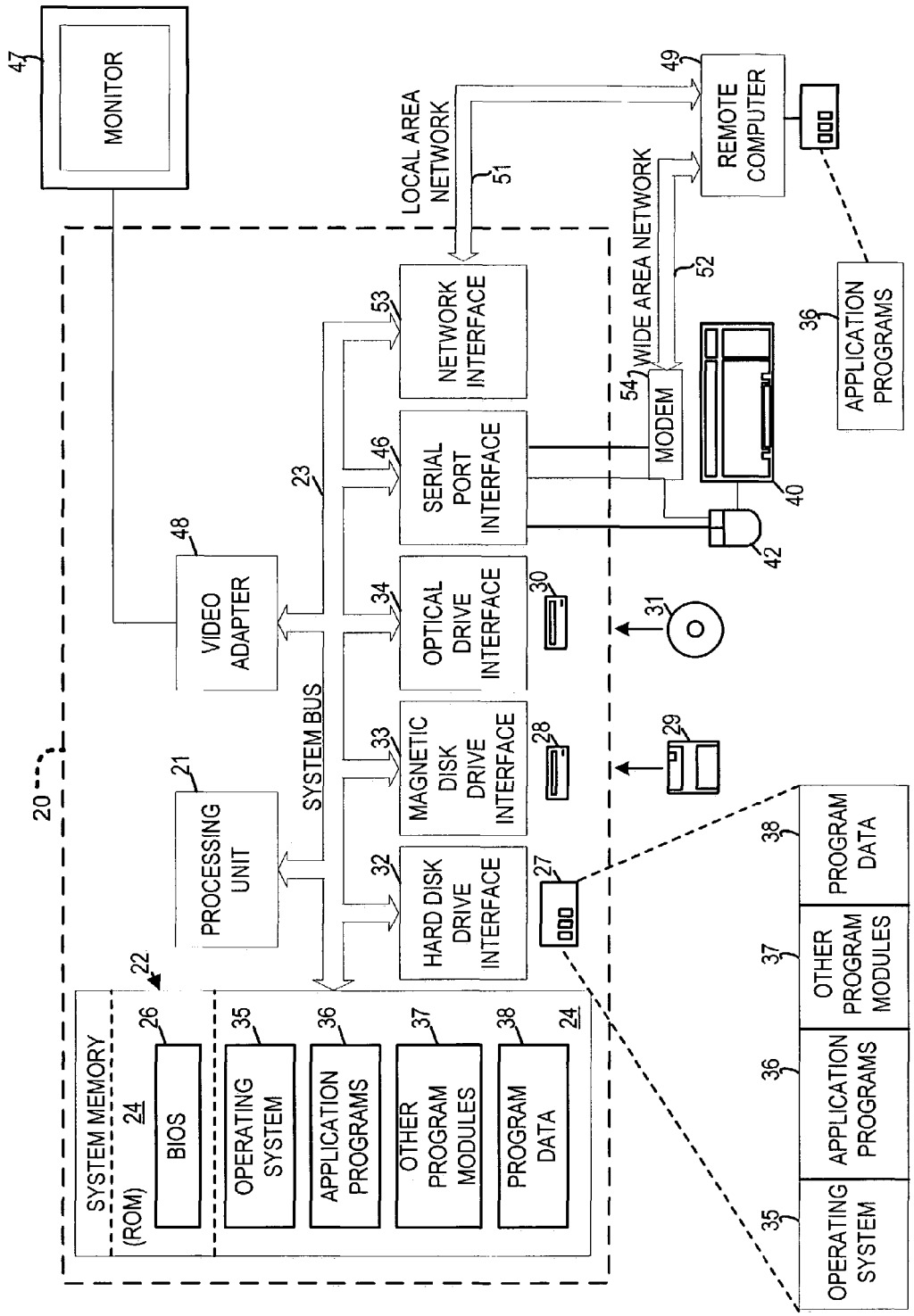
FIG. 6 illustrates an exemplary system useful for implementing an embodiment of the present invention.

The exemplary hardware and operating environment of FIG. 6 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 6. The logical connections depicted in FIG. 6 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

In an exemplary implementation, AI motion control systems, physics engines, training modules, avatar control modules, avatar behavior definition s modules, AI behavior control modules, or other modules may be incorporated as part of the operating system 35, application programs 36, or other program modules 37. The stimuli signals, behavior definitions, training data, context information, and control signals may be stored as program data 38.

The embodiments of the invention described herein are implemented as logical steps in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

The above specification, examples and data provide a complete description of the structure and use of exemplary embodiments of the invention. Since many embodiments of the invention can be made without departing from the spirit and scope of the invention, the invention resides in the claims hereinafter appended.

What is claimed is:

1. A method comprising:
computing an avatar behavior definition based on environmental context of a virtual reality environment and a randomly selected training behavior from a training set of personalized sample behaviors; and
generating at least one control signal to guide behavior of an entity in the virtual reality environment in accordance with the avatar behavior definition.

2. The method of claim 1 wherein the avatar behavior definition is associated with a track segment.

3. The method of claim 1 further comprising:
generating the personalized sample behaviors by recording behavior of a player in one or more training sessions in the virtual reality environment.

4. The method of claim 1 wherein the computing operation comprises:
combining a plurality of the personalized sample behaviors for a current game segment to yield the avatar behavior definition for the current game segment.

5. The method of claim 1 wherein the computing operation comprises:
combining weighted contributions of a plurality of the personalized sample behaviors for a current game segment to yield the avatar behavior definition for the current game segment.

6. The method of claim 1 wherein the computing operation comprises:
randomly selecting a personalized sample behavior from the training set using a randomly selected sample index that designates at least one of the personalized sample behaviors.

7. The method of claim 1 further comprising:
storing the personalized sample behaviors in a persistent storage medium.

8. The method of claim 1 further comprising:
recording behavior of a player in competition against the entity during game play in the virtual reality environment; and
adding the recorded behavior to the personalized sample behaviors associated with the player during the game play.

9. The method of claim 1 wherein the computing operation comprises:
identifying game segments in the training set that match the current game segment by evaluating game segment descriptors associated with personalized sample behaviors against environmental context information associated with the current game segment.

10. A computer program product encoding a computer program for executing on a computer system a computer process, the computer process comprising:
computing an avatar behavior definition based on environmental context of a virtual reality environment and a randomly selected training behavior from a training set of personalized sample behaviors; and
generating at least one control signal to guide behavior of an entity in the virtual reality environment in accordance with the avatar behavior definition.

11. The computer program product of claim 10 wherein the avatar behavior definition is associated with a game segment.

12. The computer program product of claim 10 wherein the computer process further comprises:
generating the personalized sample behaviors by recording behavior of a player in one or more training sessions in the virtual reality environment.

13. The computer program product of claim 10 wherein the computing operation comprises:
combining a plurality of the personalized sample behaviors for a current game segment to yield the avatar behavior definition for the current game segment.

14. The computer program product of claim 10 wherein the computing operation comprises:
combining weighted contributions of a plurality of the personalized sample behaviors for a current game segment to yield the avatar behavior definition for the current game segment.

15. The computer program product of claim 10 wherein the computing operation comprises:
randomly selecting a personalized sample behavior from the training set using a randomly selected sample index that designates at least one of the personalized sample behaviors.

16. The computer program product of claim 10 wherein the computer process further comprises:
storing the personalized sample behaviors in a persistent storage medium.

17. The computer program product of claim 10 wherein the computer process further comprises:
recording behavior of a player in competition against the entity during game play in the virtual reality environment; and
adding the recorded behavior to the personalized sample behaviors associated with the player during the game play.

18. The computer program product of claim 10 wherein the computing operation comprises:
identifying game segments in the training set that match the current game segment by evaluating game segment descriptors associated with personalized sample behaviors against environmental context information associated with the current game segment.

19. A system comprising:
an avatar behavior definition module computing an avatar behavior definition based on environmental context of a virtual reality environment and a randomly selected training behavior from a training set of personalized sample behaviors; and
a behavior control system generating at least one control signal to guide behavior of an entity in the virtual reality environment in accordance with the avatar behavior definition.

20. The system of claim 19 wherein the avatar behavior definition is associated with a game segment.

21. The system of claim 19 further comprising:
a training module generating the personalized sample behaviors by recording behavior of a player in one or more training sessions in the virtual reality environment.

22. The system of claim 19 wherein the computing operation comprises:
a probability density function module combining a plurality of the personalized sample behaviors for a current game segment to yield the avatar behavior definition for the current segment.

23. The system of claim 19 wherein the computing operation comprises:
a probability density function module combining weighted contributions of a plurality of the personalized sample behaviors for a current game segment to yield the avatar behavior definition for the current segment.

24. The system of claim 19 wherein the computing operation comprises:
a probability density function module randomly selecting a personalized sample behavior from the training set using a randomly selected sample index that designates at least one of the personalized sample behaviors.

25. The system of claim 19 further comprising:
a training module storing the personalized sample behaviors in a persistent storage medium.

26. The system of claim 19 further comprising:
a training module recording behavior of a player in competition against the entity during game play in the virtual reality environment and adding the recorded behavior to the personalized sample behaviors associated with the player during game play.

27. The system of claim 19 wherein the computing operation comprises:
a probability density function module identifying game segments in the training set that match the current game segment by evaluating game segment descriptors associated with personalized sample behaviors against environmental context information associated with the current game segment.

* * * * *